US006675061B2

(12) United States Patent
Hirai et al.

(10) Patent No.: US 6,675,061 B2
(45) Date of Patent: Jan. 6, 2004

(54) NUMERICALLY CONTROLLED CURVED SURFACE MACHINING UNIT

(75) Inventors: Junichi Hirai, Hitachi (JP); Hiroshi Arai, Hitachiota (JP); Tamotsu Harihara, Fujisawa (JP); Osamu Chiba, Hitachinaka (JP); Masaaki Takahashi, Hitachi (JP); Nobuhisa Kanamaru, Hitachi (JP)

(73) Assignees: Hitachi, Ltd., Tokyo (JP); Hitachi Software Engineering Co., Ltd., Yokohama (JP)

( * ) Notice: Subject to any disclaimer, the term of this patent is extended or adjusted under 35 U.S.C. 154(b) by 0 days.

(21) Appl. No.: 10/437,279

(22) Filed: May 14, 2003

(65) Prior Publication Data

US 2003/0200005 A1 Oct. 23, 2003

Related U.S. Application Data

(63) Continuation of application No. 09/791,561, filed on Feb. 26, 2001, now Pat. No. 6,587,747.

(51) Int. Cl.[7] .............................................. G06F 19/00
(52) U.S. Cl. .................. 700/189; 700/187; 318/568.15; 345/442; 345/420
(58) Field of Search .................. 700/182, 187–189; 345/420, 441–442, 764, 964; 318/568.13, 568.15, 570–574

(56) References Cited

U.S. PATENT DOCUMENTS

| 5,282,143 A | 1/1994 | Shirai |
| 5,726,896 A | 3/1998 | Jia et al. |
| 5,808,263 A | 9/1998 | Beltrami |
| 5,815,401 A | 9/1998 | Otsuki et al. |
| 5,936,864 A | 8/1999 | Otsuki et al. |
| 5,955,856 A | 9/1999 | Sato et al. |
| 5,994,863 A | 11/1999 | Fujita |
| 6,268,871 B1 * | 7/2001 | Rice et al. ................... 345/442 |
| 6,311,098 B1 * | 10/2001 | Higasayama et al. ....... 700/159 |

FOREIGN PATENT DOCUMENTS

| EP | 0 706 103 A1 | 9/1995 |
| GB | 2 341 243 A | 3/2000 |
| JP | 9-114512 | 5/1997 |

OTHER PUBLICATIONS

"On Nurbs : A Survey", L. Piegl, IEEE Computer Graphics and Applications, IEEE Inc. New York, US, vol. 11, NR, pp. 55–71.

"Integer Subdivision Algorithm for Rendering Nurbs Curves", N. Anantakrishinan et al, Visual Computer, Springer, Berlin, DE, vol. 8, NR. 3, pp. 149–161.

* cited by examiner

*Primary Examiner*—Leo Picard
*Assistant Examiner*—Alexander Kosowski
(74) *Attorney, Agent, or Firm*—Antonelli, Terry, Stout & Kraus, LLP

(57) ABSTRACT

Performing NURBS (non-uniform rational B-spline) interpolation machining is performed by reading cutter location (CL) data consisting of a tool control point vector and a tool axis vector on a workpiece coordinate system, converting the CL data into a position vector of three linear axes and a rotation angle on a machine coordinate system in accordance with the machine configuration of a simultaneous multiple-axis NC machine, calculating knot vectors of a NURBS curve with the most suitable chord length on the basis of a position vector of the three linear axes and a rotation angle, calculating a NURBS curve of the three linear axes and one rotary axis using the knot vectors, converting the NURBS curve into NURBS interpolation NC data, converting the feed rate on a workpiece coordinate system into the feed rate per minute on a machine coordinate system, and transmitting NC data to a NC machine.

2 Claims, 16 Drawing Sheets

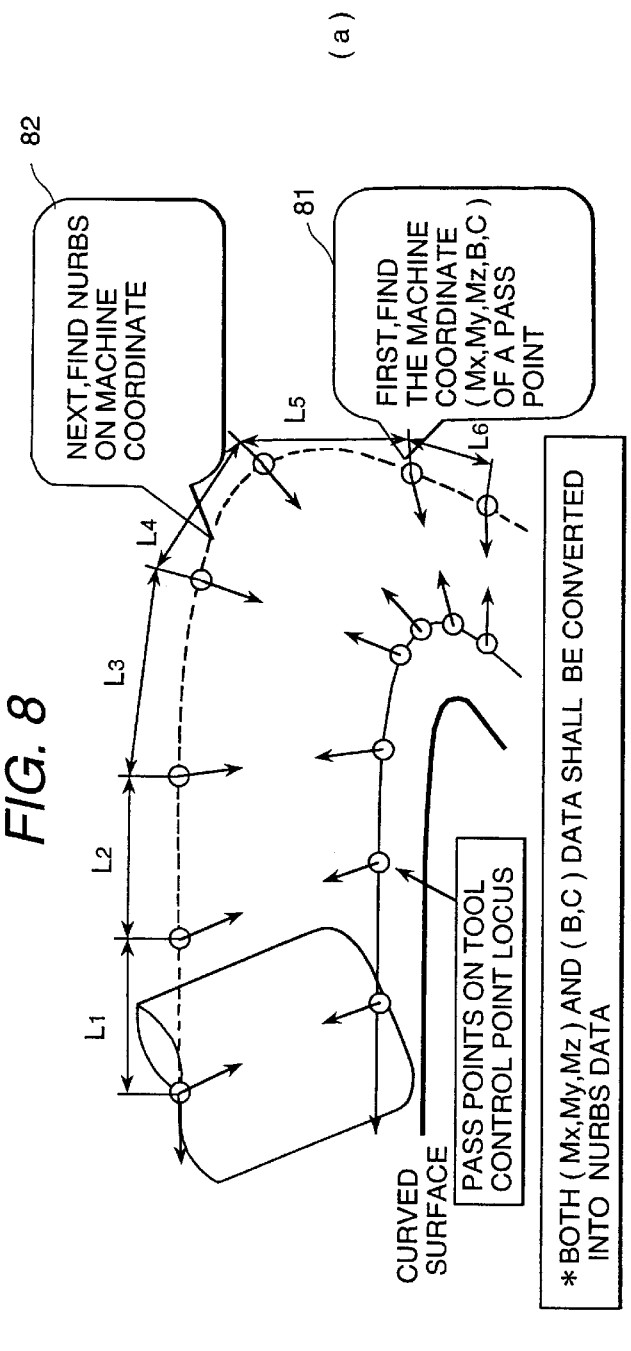
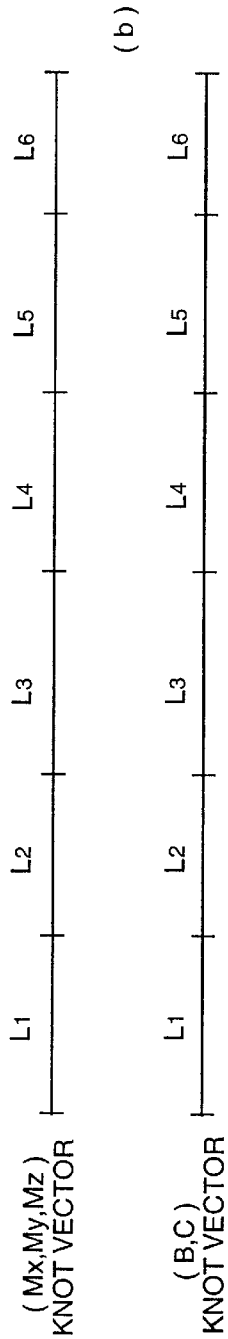
FIG. 8

T = [ 0 0 0 0 1 1 1 1 ]

T = [ -3 -2 -1 -0 1 2 3 4 ]

NURBS CURVED LINE AND ITS CONTROL POINT
OF MACHINE COORDINATE SYSTEM FEED RATE

NURBS CURVED LINE CONTROL POINT BELOW ZERO

OPTIMIZATION OF MACHINE COORDINATE SYSTEM
FEED RATE BY BLENDING COEFFICIENT

NUMERICALLY CONTROLLED CURVED SURFACE MACHINING UNIT

CROSS REFERENCE TO RELATED APPLICATION

This is a continuation of U.S. application Ser. No. 09/791,561, filed Feb. 26, 2001 now U.S. Pat. No. 6,587,747, the subject matter of which is incorporated by reference herein.

BACKGROUND OF THE INVENTION

The present invention relates to a numerically controlled curved surface machining unit; and, more particularly, the invention relates to a unit that provides improved machining surface roughness and accuracy and makes it possible to achieve high-speed machining.

In conventional numerically controlled (NC) curved surface machining, since a workpiece is machined by linear approximation, as shown in FIG. 2(a), the machining surface roughness is poor and a number of hand-finishing steps are needed. Besides, as shown in FIG. 2(b), since the average feed rate decreases as a result of acceleration or deceleration during positioning, a long machining time is needed and, what is worse, there is a problem in that a vast amount of NC data at shorter pitches are required to improve the machining surface accuracy.

Japanese Application Patent Laid-Open Publication No. HEI 9-114512 (1997) proposes a method of performing curved surface machining using a NC machine tool for the purpose of improving the machining surface accuracy and decreasing the NC data volume. Even with this conventional method, however, there is still a problem of poor machining surface roughness due to linear approximation and lower average feed rate due to acceleration or deceleration during positioning.

In order to solve these problems, interpolation by a NURBS curve, as shown in FIG. 3, has been proposed. A NURBS (Non-Uniform Rational B-Spline) curve is a kind of B-spline curve that is expressed by a rational expression wherein the pitches of the nodal points constituting the curve are not uniform. It is a characteristic feature that the NURBS curve uses a rational expression in defining a curve, while other curves use a polynomial.

By controlling these, a curve can be locally transformed without difficulty. Besides, it becomes possible to uniformly handle shapes, such as a cylinder, cone, s sphere, hyperbola, ellipse, and parabola, that cannot be expressed accurately by other curves.

In FIG. 3, the NURBS curve defines a curve by the control point Pi, weights wi, and knot vector xi; where k is degree, Pi is control point, wi is weights, xi is knot (xi≦xi+1), [x0, x1, . . . , xm](m=n+k) is knot vector, and t is spline parameter.

When a B-spline basis function N(t) is expressed by a de Boor-Cox recursive expression, Expressions 1 and 2 are obtained. The NURBS curve P (t) for interpolation results in Expression 3.

$$N_{i,1}(t) = \begin{cases} 1 (x_i \leq x_{i+1}) \\ 0 (t < xi, x_{i+1} \leq t) \end{cases} \quad \text{Expression 1}$$

$$N_{i,k}(t) = \frac{(t - x_i)N_{i,k-1}(t)}{x_{i+k-1} - X_i} + \frac{(x_{i+k} - t)N_{i+1,k-1}(t)}{x_{i+k} - X_{i+1}} \quad \text{Expression 2}$$

$$P(t) = \frac{\sum_{i=0}^{n} N_{i,k}(t) w_i z P_i}{\sum_{i=0}^{n} N_{i,k}(t) w_i} \quad \text{Expression 3}$$

$(X_{k-1} \leq t \leq X_{m-k+1})$

A NURBS interpolation instruction is outputted in the following format. G05P10000; (high-accuracy continuous tool path control mode ON)

. . .

G06.2
[P_]K_X_Y_Z_α_β_[R-][F_];
K_X_Y_Z_α_β_[R_];
K_X_Y_Z_α_β_[R_];
K_X_Y_Z_α_β_[R_];

. . .

K_X_Y_Z_α_β_[R_];
K_;

. . .

K_;
G01 . . .

. . .

G05P0; (high-accuracy continuous tool path control mode OFF)

where;
G06.2: NURBS interpolation mode ON
P: Degree of NURBS curve
K_X_Y_Z_α_β_: Control point (α, β: Rotary axis instruction)
R: Weights
K: Knot
F: Feed rate In NURBS interpolation machining, since a curve can be smoothly machined, as shown in FIG. 2(c), less hand-finishing steps are needed. In addition, since acceleration and deceleration during positioning becomes smooth and the average feed rate increases, as shown in FIG. 2(d), the machining time can be shortened and high-speed machining becomes possible. Further, it is said to be advantageous that, since the control points for the NURBS interpolation can be set effectively, the required NC data volume can be less.

With the conventional NURBS (non-uniform rational B-spline) interpolation method, simultaneous machining on three linear axes has been possible for the purpose of machining a mold. On pages 12–17 of "Machines and Tools" (February 1998 issue), is an article entitled "High-Speed High-Accuracy Machining by NURBS Interpolation and Smooth Interpolation", a machining method with an enhanced function up to simultaneous 5-axis machining including two rotary axes is described for high-efficiency machining of a turbine blade, hydraulic turbine impeller, or the like.

On pages 8–9 of "Mold Engineering" (July 1998 issue), in an article entitled "Generation of High-Quality Machining Surface by Additional Axis NURBS Interpolation Machining", a method of machining a turbine blade under control of software using a simultaneous 5-axis NURBS interpolation function is described. Since the chord length between the knot vectors is uniform in this machining method, there is a problem in that less consideration is given to the control of a curve using the knot vector, which is a characteristic feature of a NURBS curve.

According to this article, the control points on a NURBS curve calculated on a workpiece coordinate system are transformed into a machine coordinate system in accordance with the tool axis vector, and the result is employed as the control points for 5-axis NURBS interpolation without any compensation and the same knot vector as used on a workpiece coordinate system is applied to the 5-axis NURBS interpolation.

Generally speaking, however, there is no guarantee of achieving a smooth curve even if the same knot vector is employed after the coordinate transformation. For this reason, wind or warp is likely to be caused on a machining surface.

In addition, the method described in this article handles ball end mill machining where the offset of a contact point between the tool control point and the curved surface is small, and it does not handle radius end mill machining where the offset of a contact point between the tool control point and the curved surface is big. Because of this, there remains a high possibility that wind or warp is caused depending upon the extent of the offset.

SUMMARY OF THE INVENTION

Under these circumstances, it has been desired to develop a method for calculating the knot vector and control point applicable to smooth machining of a curved surface by 5-axis NURBS interpolation using the NC data that is converted from a NURBS curve calculated on a workpiece coordinate system into a machine coordinate system in accordance with the inclination of the tool axis vector.

The object of the present invention is to provide a numerically controlled curved surface machining unit which, by moving a tool smoothly along a NURBS curve, makes it possible not only to improve the machining surface roughness and machining surface accuracy but to achieve high-speed machining so as to be able to eliminate hand finishing and reduce the number of machining steps drastically.

In order to solve the above problems, the present invention proposes a numerically controlled curved surface machining unit equipped with three linear axes and, at least, one rotary axis, including a simultaneous multiple-axis control NC machine, which is numerically controlled by a numerical control unit (NC controller) with a numerical control NURBS (non-uniform rational B-spline) interpolation function. This machining unit is provided with a means for reading the tool control point vector data and tool axis vector data, that is calculated along the tool path on a workpiece coordinate system with defined curved shape by a host computer, as cutter location (CL) data and converting the CL data into a position vector of the three linear axes and a rotation angle on a machine coordinate system so as to operate the simultaneous multiple-axis control NC machine in accordance with the machine configuration of the NC machine; a means for calculating knot vectors of a NURBS curve with the most suitable chord length on the basis of a position vector of the three linear axes and a rotation angle calculated on a machine coordinate system; a means for calculating each NURBS curve of the three linear axes and one rotary axis using the knot vectors; a means for converting the NURBS curve into NURBS interpolation NC data; a means for converting the feed rate on the workpiece coordinate system into the feed rate per minute or feed rate per inverse time on the machine coordinate system; and a means for transmitting the obtained CL data to the NC controller.

The machining unit can be provided with a means for removing or inserting CL data along the tool path in accordance with the machining accuracy of the curved surface, upon reading data as CL data.

The machining unit can also be provided with a means for reading a compensation value based on the individual difference of each tool from the NC controller, upon reading data as CL data, and compensating the read CL data in accordance with the tool compensation value.

The machining unit may be provided with a means for dividing a NURBS curve based on the curvature or pitch of the CL data plotted along the tool path direction.

The machining unit can also be provided with a means for calculating a NURBS curve using, as the knot vector, the chord length of the position vector of the three linear axes plotted along the tool path direction on a machine coordinate system.

It is also possible that the machining unit is provided with a means for calculating a NURBS curve using, as the knot vector, the chord length obtained by multiplying by a coefficient each chord length of the position vector of the three linear axes plotted along the tool path direction on a machine coordinate system, and the chord length of the tool control point vector on a workpiece coordinate system and adding up the products.

The machining unit may be provided with a means for transforming a curve into NURBS interpolation in a case where the position vector of the three linear axes and the rotation angle of the rotary axis calculated on a machine coordinate system are defined by a curve formed by any of B-spline interpolation, Bezier interpolation, Coons interpolation, a polynomial, or a combination of a line and an arc.

It is desired that the machining unit is provided with a means for generating a NURBS curve or multiple NURBS curves with continuous curvature by modifying or inserting a NURBS curve(s) so that the curvature at a break point of multiple NURBS curves continuously changes within a range of machining accuracy.

The machining unit can be provided with a means for setting the tool axis vector of CL data to a specific value and converting the data into NURBS interpolation NC data for simultaneous 3-axis control NC machine equipped only with three linear axes.

The machining unit may be provided with a means for obtaining the CL data for machining a workpiece along a screw-and-spiral or single-stroke path.

It is also possible that the machining unit is provided with a means for reading the linear interpolation NC data for a simultaneous multiple-axis machine and converting the data into CL data.

The machining unit may sometimes be provided with a means for specifying the CL data that must be covered by machining without fail.

In order to solve the above problems, the present invention also proposes a numerically controlled curved surface machining unit of the type described above, that is provided with a means for reading a NURBS curve of three-linear axes and a rotary axis calculated on a machine coordinate system; a means for reading cutter location (CL) data calculated on a workpiece coordinate system; a means for calculating a NURBS curve from the tool control point center position vector of the CL data; a means for calculating a NURBS curve from the tool axis vector of the CL data; a means for calculating each sequence-of-point data to a specified machining accuracy from the NURBS curve of three linear axes and a rotary axis on a machine coordinate system; a means for converting the sequence-of-point data on a machine coordinate system into the CL data on a workpiece coordinate system; and a means for calculating each error between the CL data converted into a workpiece coordinate system and a NURBS curve of the tool control point vector and also a NURBS curve of the tool axis vector calculated on a workpiece coordinate system.

The machining unit can be provided with a means for modifying the control point or knot vector or weights of the NURBS curve on a machine coordinate system based on the calculation result of the error.

It is also possible that the machining unit is provided with a means for reading a tool compensation value from the NC machine and converting the CL data calculated on a workpiece coordinate system in accordance with the compensation value.

BRIEF DESCRIPTION OF DRAWINGS

FIG. 8 is a diagram showing a way of calculating a knot vector and a NURBS curve on a machine coordinate system according to the present invention;

DESCRIPTION OF PREFERRED EMBODIMENTS OF THE INVENTION

Preferred embodiments of a numerically controlled curved surface machining unit according to the present invention will be described with reference to FIG. 1 through FIG. 17.

Figure 1:
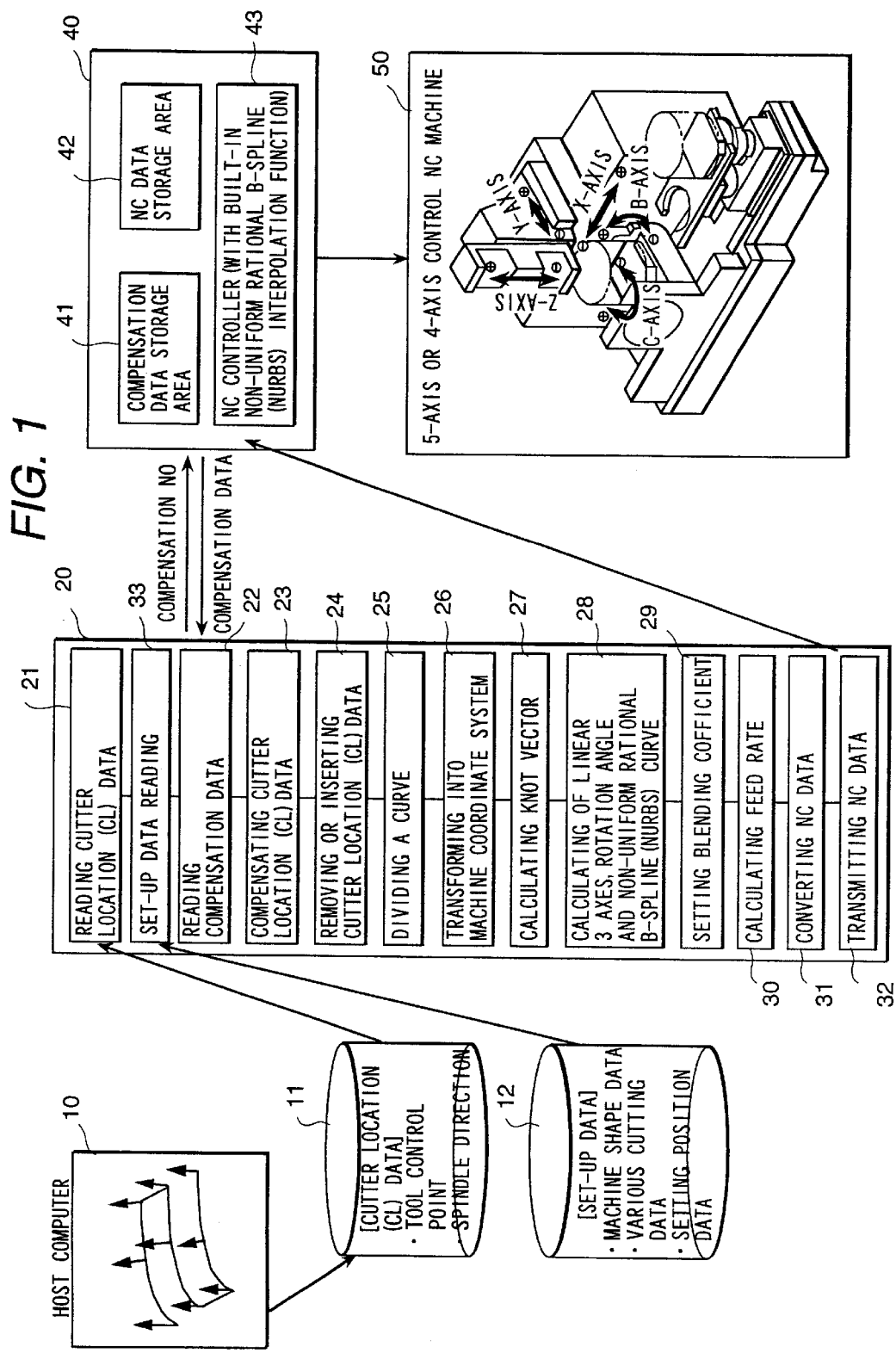
FIG. 1 is a block diagram showing the system configuration of an embodiment of a numerically controlled curved surface machining unit according to the present invention.
Figure 2:
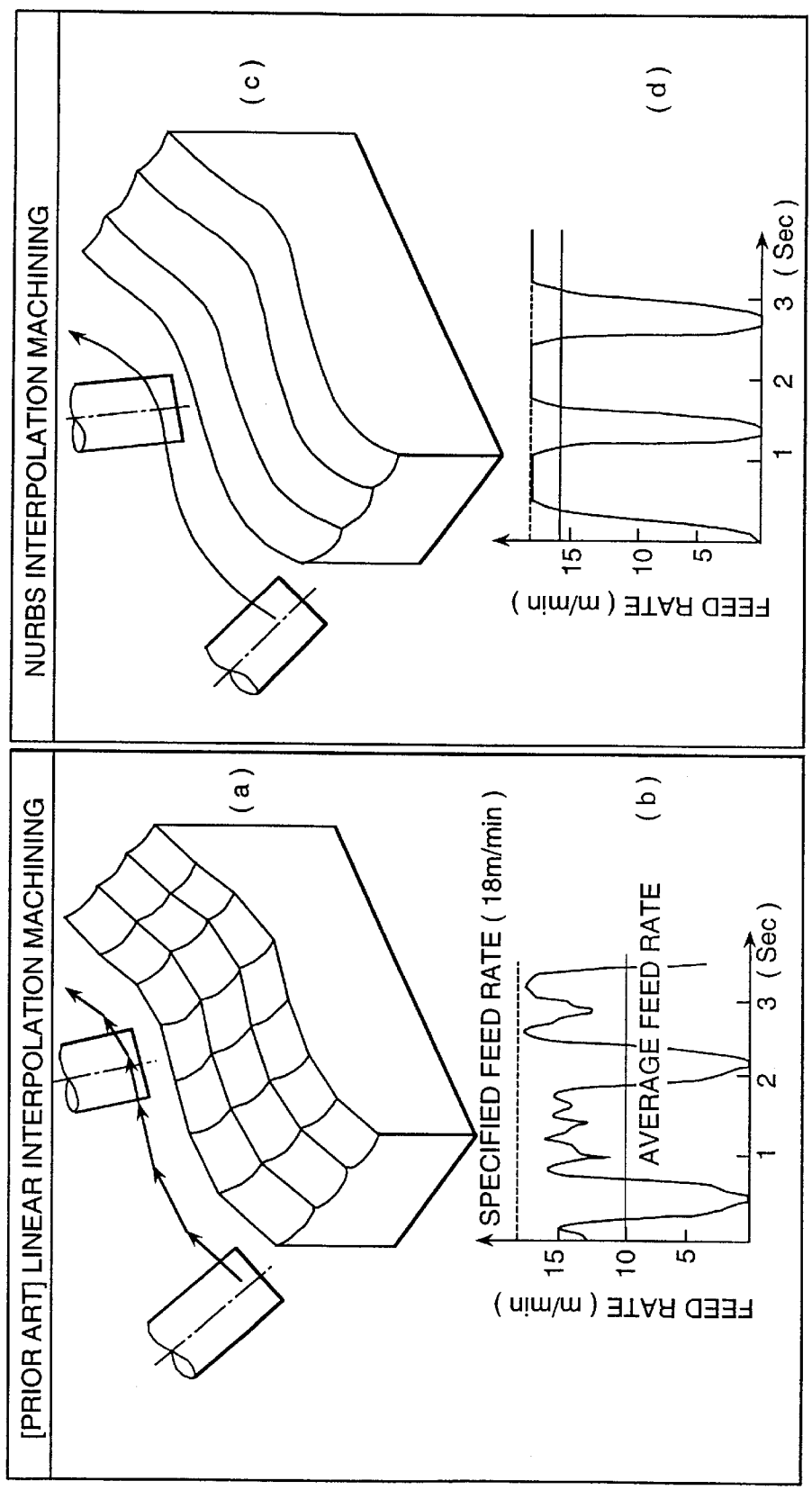
FIG. 2 is a diagram showing a comparison of conventional linear interpolation machining and conventional NURBS interpolation machining.

FIG. 1 is a block diagram showing the overall configuration of an embodiment of the numerically controlled curved surface machining unit according to the present invention. A host computer 10 stores the tool control point vector and tool axis vector calculated along the tool path on a coordinate system with a defined curved shape (workpiece coordinate system) in an external file 11 as cutter location (CL) data.

In step 21, a computer 20 of the numerically controlled curved surface machining unit reads CL data from the external file 11. In step 33, the computer reads set-up data necessary for NC data conversion, including machine shape data, cutting specification data and setting position data, from an external file 12.

There is always an error between the supposed tool length or tool diameter in preparation of NC data and the actual tool length or tool diameter. In step 22, in order to compensate for such error, the computer 20 specifies a tool compensation No. and requests a NC controller 40 to output compensation data. The NC controller 40 reads the compensation data, corresponding to the specified compensation No., from a compensation data storage area 41 and outputs the data to the computer 20. The computer 20 reads the compensation data outputted from the NC controller 40.

Figure 4:
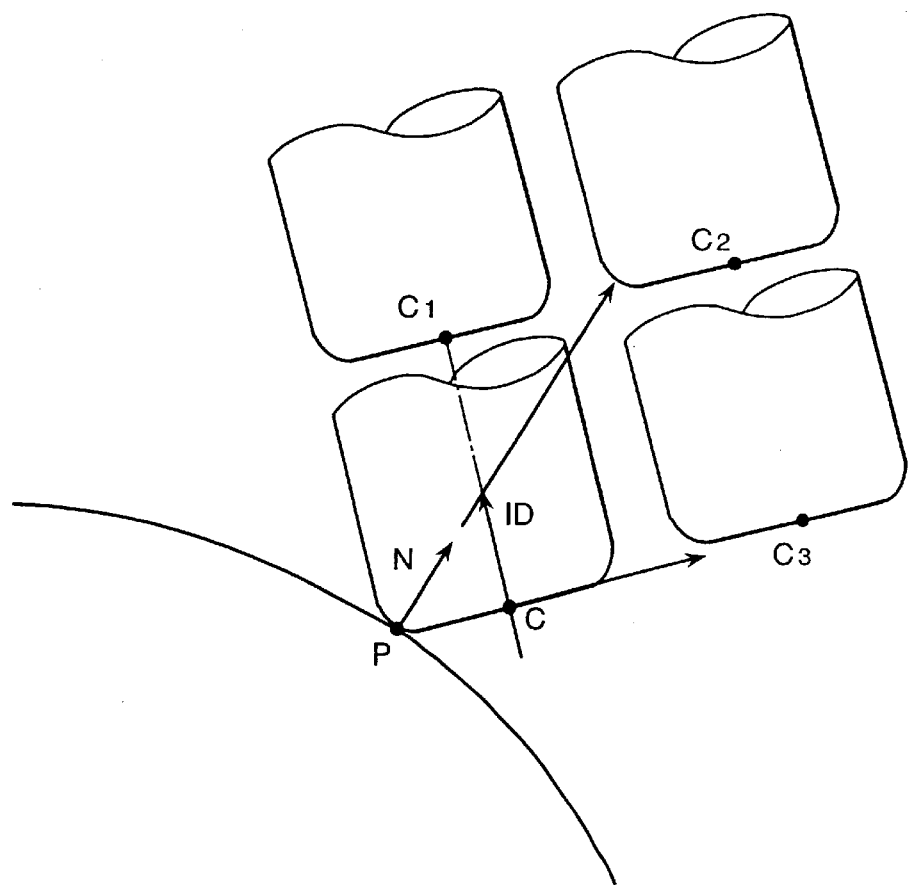
FIG. 4 is a diagram showing an example of way of a compensating CL data.

In step 23, the computer 20 compensates the CL data along a desired direction by the method shown in FIG. 4 and by the following Expression 4, wherein C is the tool control point vector, D is the tool axis vector, P is the tool contact point vector on C, and N is the normal vector on P. C1 is a tool control point vector compensated by d1 along the spindle direction, C2 is a tool control point vector compensated by d2 along the normal direction, and C3 is a tool control point vector compensated by d3 along the tool diameter direction.

$$C_1 + C + d_1 D$$
$$C_2 = C + d_2 N$$
$$C_3 = C + \frac{DxNxD}{|DxNxD|} d_3$$

Expression 4

5

Since CL data normally comprises a tool control point vector and a tool axis vector, compensation of C1 only is possible. If the tool contact point vector and normal vector used for the calculation of the CL data are known, compensation of the vectors C2 and C3 or compensation of a combination of vectors C1, C2 and C3 is possible. Compensating the CL data by this method makes it possible to generate compensated NC data for NURBS (non-uniform rational B-spline) interpolation.

In the NURBS interpolation function according to the article "High-Speed High-Accuracy Machining by NURBS Interpolation and Smooth Interpolation" in the aforementioned publication "Machines and Tools", no compensation is permitted.

Figure 5:
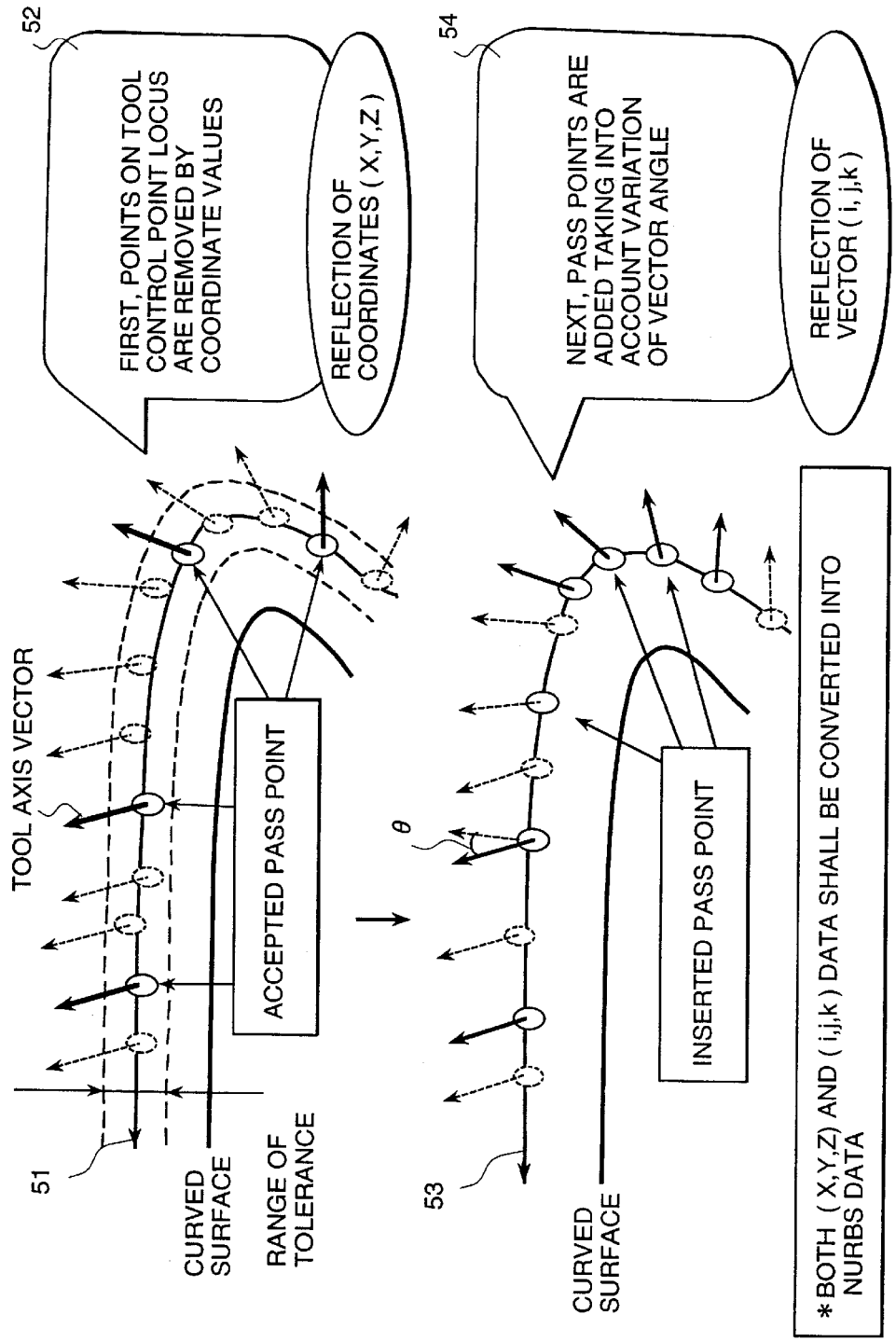
FIG. 5 is a diagram showing a way of removing or adding CL data according to the present invention.

In step 24, CL data is removed or inserted by the method shown in FIG. 5 in order to improve the machining accuracy and also to reduce the data volume. First, a passing curve is calculated from the tool control point vector by least squares curve approximation to find a NURBS curve 51. Then, in step 52, CL data is removed by removing data items not within a range of specific tolerance.

Figure 3:
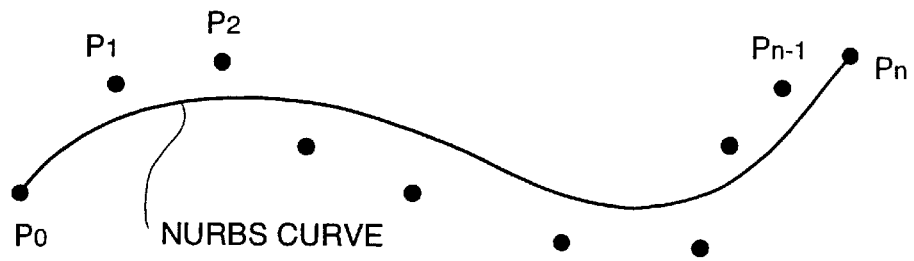
FIG. 3 is a diagram showing the relationship between a NURBS curve and control points.

A NURBS curve is determined by the definition of the NURBS curve shown in FIG. 3 and by Expressions 1, 2 and 3. A method for generating a NURBS curve from a sequence of points is described in, for example, "The NURBS Book" by Les Piegl and Wayne Tiller.

Then, a NURBS curve 53 is calculated based on the tool axis vector of the removed CL data. In step 54, the tool axis vector on the NURBS curve 53 corresponding to the pass points of the tool control point vector is calculated and the variation of angle is calculated. If the difference from the original CL data is greater than the tolerance, a pass point is inserted so as to improve the accuracy. The tolerance for removing or inserting CL data is set to 0.01 mm.

Figure 6:
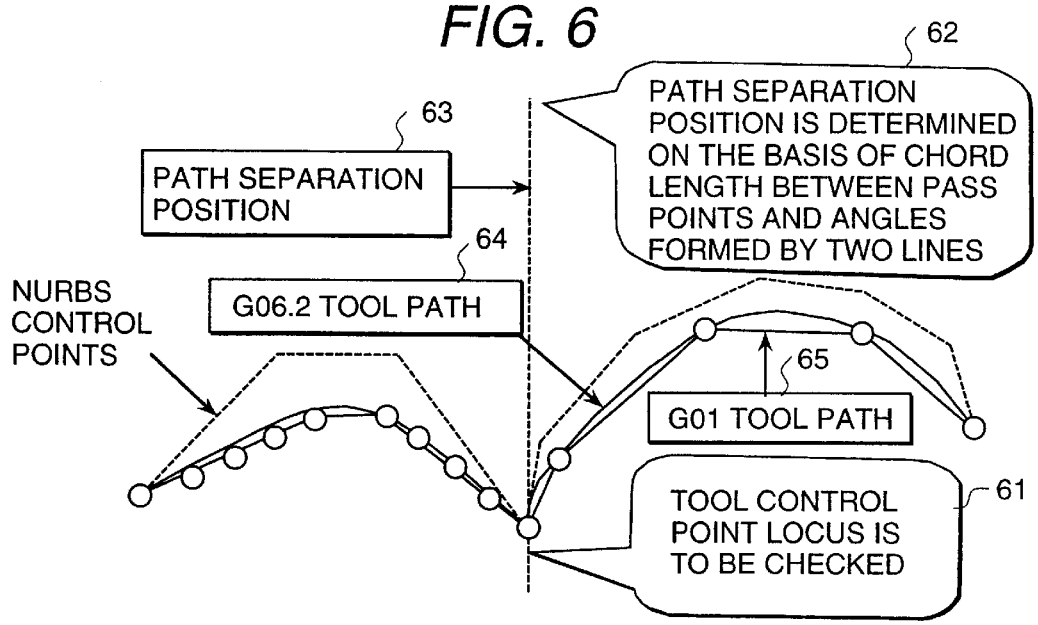
FIG. 6 is a diagram showing a way of dividing a NURBS curve according to the present invention.
Figure 7:
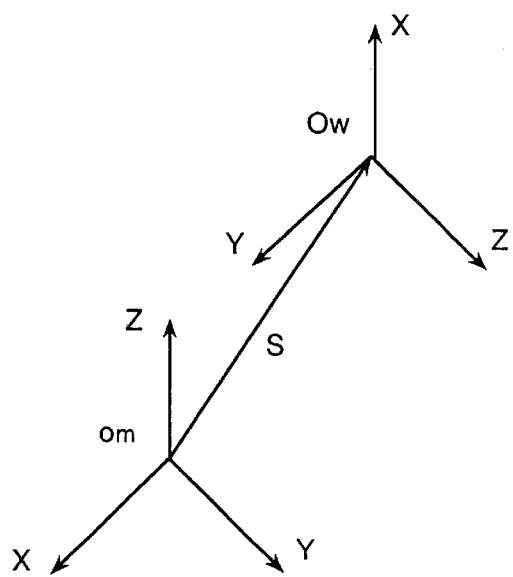
FIG. 7 is a diagram showing the relationship between coordinate systems upon transformation from a machine coordinate system into a workpiece coordinate system according to the present invention.

In step 25, the NURBS curve 53 calculated in step 24 is divided. FIG. 6 shows the locus of the tool control point vector. From the NURBS curve of the tool control point vector (i.e., G06.2 tool path 64) and the linear tool path (i.e., G01 tool path 65), a path dividing position 63 is found. If the chord length between the pass points becomes shorter suddenly, or the angle formed by two lines changes sharply, turbulence is caused on the NURBS curve. Accordingly, a position where the chord length becomes too short or the angle formed by two lines changes sharply is found and regarded as a path dividing position 63 of the curve, and then the curve is divided at the path dividing position 63 so as to improve the accuracy of the curve.

In step 26, CL data is converted into a machine coordinate system. On a table 2-axis type 5-axis machine 50 in FIG. 1, a node at which the C-axis table rotation center and the B-axis table rotation center intersect with each other at a right angle is the origin Om on the machine coordinate system. A workpiece is set on the C-axis table and the origin on the workpiece coordinate system is assumed to be at Ow. Assuming that, as seen from the origin Om on the machine coordinate system, S is the position vector of the origin ow on the workpiece coordinate system, the transformation of the tool control point vector (X, Y, Z) and tool axis vector (I, J, K) on the workpiece coordinate system into the machine coordinate system (Mx, My, Mz, B, C) can be expressed by the coordinate system in FIG. 7 and the following Expressions 5, 6, 7, 8 and 9.

$$W=(X, Y, Z)$$
$$D+(I, J, K)$$
$$Wa=(Y, Z, X)$$
$$Da=(J, K, I)=(Dai, Daj, Dak)$$
$$S=(Xs, Ys, Zs)$$
$$Ws=Wa+S=(Wax, Way, Waz) \quad \text{Expression 5}$$
$$C = \tan^{-1} = (Daj/Dai) \quad \text{Expression 6}$$
$$B = \tan(\sqrt{Dai^{}2 + Daj^{}2} / Dak)$$

$$MC = \begin{pmatrix} \cos(-C) & -\sin(-C) & 0 \\ \sin(-C) & \cos(-C) & 0 \\ 0 & 1 & 1 \end{pmatrix} \quad \text{Expression 7}$$

$$Mb = \begin{pmatrix} \cos(-B) & 0 & \sin(-B) \\ 0 & 1 & 0 \\ -\sin(-B) & 0 & \cos(-B) \end{pmatrix}$$

$$\begin{pmatrix} Mx \\ My \\ Mz \end{pmatrix} = MbMc \begin{pmatrix} Wax \\ Way \\ Waz \end{pmatrix} \quad \text{Expression 8}$$

Expression 9

$$M=(Mx, My, Mz, B, C)$$

In the above expressions, (Mx, My, Mz, B, C) represents the coordinate of each machine axis X, Y, Z, B, and C. The coordinate transformation expression is unique to each machine. This transformation is applicable also to a table 1-axis, table 1-axis type, and spindle 2-axis type machine.

According to known technology, the control points on a NURBS curve calculated on a workpiece coordinate system are transformed into a machine coordinate system in accordance with the tool axis vector, and the result is employed as the control points for 5-axis NURBS. interpolation without any compensation, and the same knot vector as used on a workpiece coordinate system is applied to the 5-axis NURBS interpolation.

Generally speaking, however, there is no guarantee of achieving a smooth curve even if the same knot vector is employed after the coordinate transformation. For this reason, wind or warp is likely to be caused on a machining surface.

On the contrary, in accordance with the present invention, the chord length between each machine coordinate is used as the knot vector, as shown in FIG. 8(*b*), and the control points on each NURBS curve of the three linear axes (Mx, My, Mz) and two rotary axes (B, C) are calculated again so that each curve changes continuously and smoothly. Thus, the machining accuracy is improved.

In step 27, the knot vector is calculated. In step 81 of FIG. 8, the machine coordinate (Mx, My, Mz, B, C) of all pass points is first calculated using the above Expressions 5, 6, 7, 8 and 9. The chord length (Li) between each machine coordinate is calculated to obtain the knot vector, as shown in FIG. 8(b). The same knot vector is used for (Mx, My, Mz) and for (B, C).

In step 28, from the sequence-of-point data of the three linear axes (Mx, My, Mz) and two rotary axes (B, C) transformed into a machine coordinate system from the CL data on a workpiece coordinate system and the knot vector calculated in step 27, a NURBS curve shown by Expressions 1, 2 and 3 is generated according to a NURBS curve generating method described in, for example, the aforementioned publication "The NURBS Book".

In step 28, using the knot vector in FIG. 8(b) and the definition of NURBS curve shown in FIG. 3 and by Expressions 1, 2 and 3, each NURBS curve of the three linear axes (Mx, My, Mz) and two rotary axes (B, C) is calculated.

Figure 9:
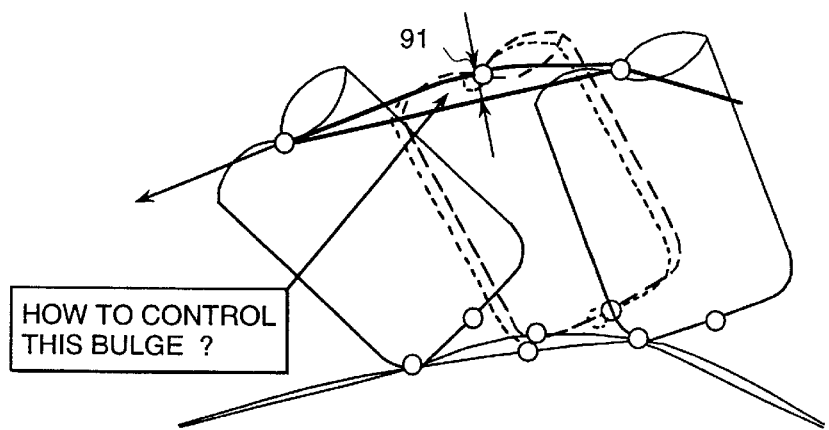
FIGS. 9(a) and 9(b) are diagrams showing a way of smoothing a NURBS curve by setting a blending factor according to the present invention.
Figure 9:
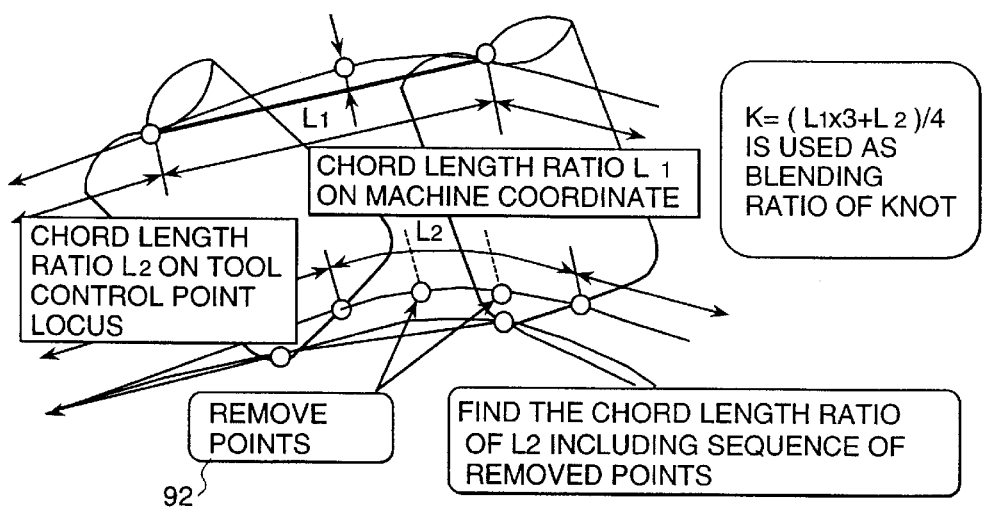
Figure 10:
FIGS. 10(a) and 10(b) are diagrams showing a way of forming a single continuous curve by inserting a fillet curve with R according to the present invention.
Figure 10:
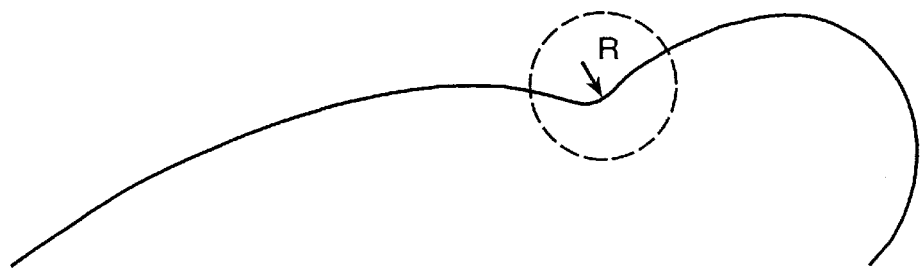
Figure 11:
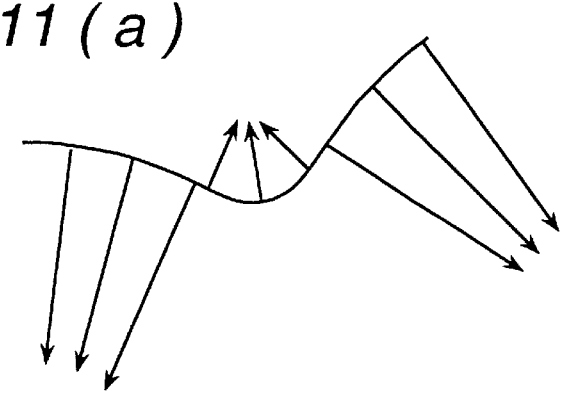
FIGS. 11(a) and 11(b) are diagrams showing a way of achieving the continuity of radius of curvature by modifying a machining shape According to the present invention.
Figure 11:
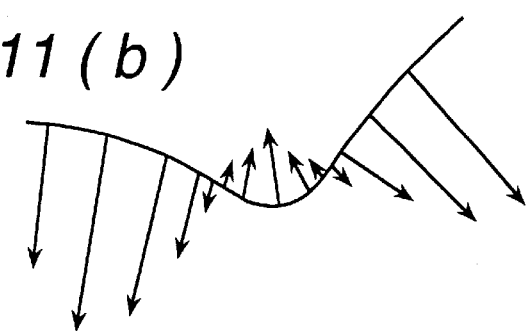

In step 29, a blending factor is calculated. If a workpiece is machined according to the NURBS curve calculated in step 28, a bulge can be caused on the curve, as shown in FIG. 9, and, accordingly an irregularity may be caused on the machined surface. In order to prevent this, first, the chord length of the tool control point vector on a workpiece coordinate system is calculated to a higher accuracy, as shown in FIG. 9(b), including the points 92 removed in step 24, to obtain the knot vector on a workpiece coordinate system. Then, a knot vector is obtained by multiplying each knot vector on a machine coordinate system and knot vector on a workpiece coordinate system by the blending factor and adding up the products, and the result is used as the knot vector on a machine coordinate system.

An irregularity on the machined surface can be eliminated as a result of the above. in this embodiment, smooth machining can be achieved by setting the blending factor to 3:1. This factor can be modified for a different workpiece.

In step 30, the feed rate on the machine coordinate system is calculated. Provided that the start point on the workpiece coordinate system is (Xws, Yws, Zws), end point (Xwe, Ywe, Zwe), chord length Lw, and feed rate Fw and that the start point on the machine coordinate system is (Xms, Yms, Zms, Bms, Cms), end point (Xme, Yme, Zme, Bme, Cme), chord length Lm, and feed rate Fm, the feed rate Fm on the machine coordinate system is obtained from Expression 10.

$$Lw = \sqrt{(Xwe - Xws)^{}2 + (Ywe - Yws)^{}2 + (Zwe - Zws)^{**}2}$$

$$Lm = \sqrt{(Xme - Xms)^{}2 + (Yme - Yms)^{}2 + (Zme - Zms)^{}2 + (Bme - Bms)^{}2 + (Cme - Cms^{**}2}$$

$$Fm = Fw^* Lm/Lw$$

There is another method where the feed rate is specified by inverse time (feed per inverse time) when this applies, the feed rate Fm on the machine coordinate system is obtained from Expression 11.

$$Fm=Fw/Lm \quad \text{Expression 11}$$

In step 31, by substituting the control points on the NURBS curve of the three linear axes on the machine coordinate system calculated in steps 28, 29 and 30 for X, Y and Z of the NURBS interpolation instruction in FIG. 3, control points on the NURBS curve of the two rotary axes for α and β, knot vector for K, weights for R, and the feed rate Fm for F, data is converted into CL data according to the format of the NURBS interpolation instruction in FIG. 3.

In step 32, the last converted NC data is transmitted as NC data from the computer 20 and is read and stored into the NC data storage area 42 of the NC controller 40.

A NC control mechanism 43, equipped with a built-in NURBS interpolation function of the NC controller 40, reads NC data from the NC data storage area 42 and, while analyzing the data, controls a 5-axis or 4-axis control NC machine and achieves NC machining. If a communication line is employed for data input from the external files 11 and 12 to the computer 20 and data input/output between the computer 20 and the NC controller 40, the computer 20 can be realized as a computer located at a consulting firm.

An embodiment of a method for generating one NURBS curve from multiple NURBS curves will be explained hereunder. FIG. 10(a) shows two NURBS curves connected at a break point 101. By inserting a fillet curve of a small radius R within a range of machining accuracy to the two NURBS curves in the neighborhood of the break point 101, a continuous NURBS curve can be generated.

FIG. 11(a) is an enlarged view of a portion enclosed by a dotted line in FIG. 10(b). An arrow represents the radius of curvature. In FIG. 11(a), it is noted that the radius of curvature is not continuous, particularly at the break point of the fillet curve. In this case the radius of curvature can be changed continuously by transforming the curve so that the curvature becomes continuous within a range of machining accuracy, as shown in FIG. 11(b). Since the speed of the NC controller 40 decreases at the end point of the NURBS interpolation, a concavity is caused on the curve. The above transformation of the NURBS curve is effective to prevent this concavity.

Figure 12A:
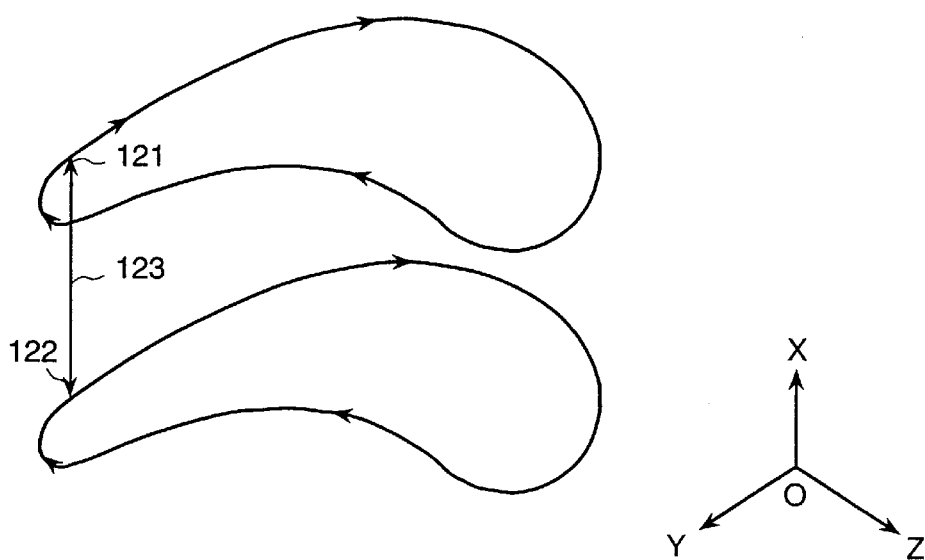
FIGS. 12(a) and 12(b) are diagrams showing a way of continuous machining by changing a connection of tool paths into a smooth curve according to the present invention.
Figure 12B:
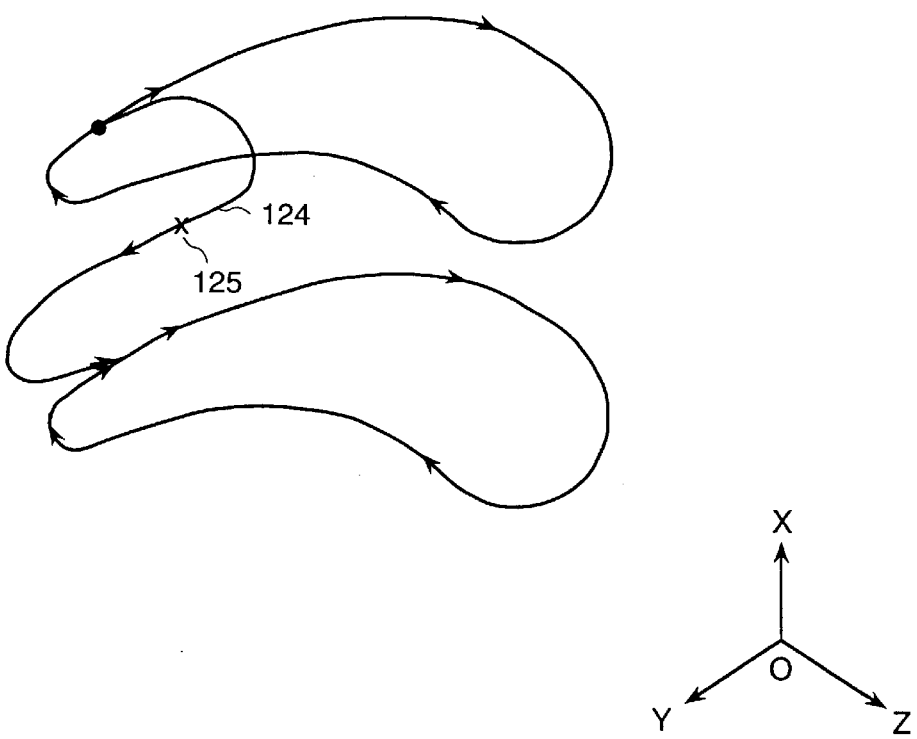
Figure 13:
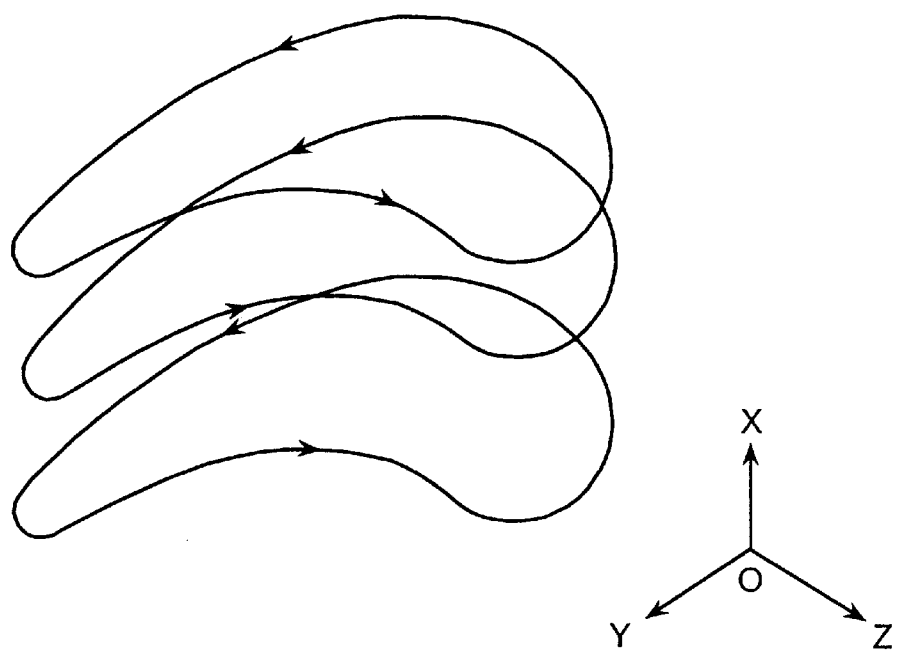
FIGS. 13(a) and 13(b) are diagrams showing a way of forming a single continuous curve by changing a tool path into a screw and spiral curve according to the present invention.
Figure 13:
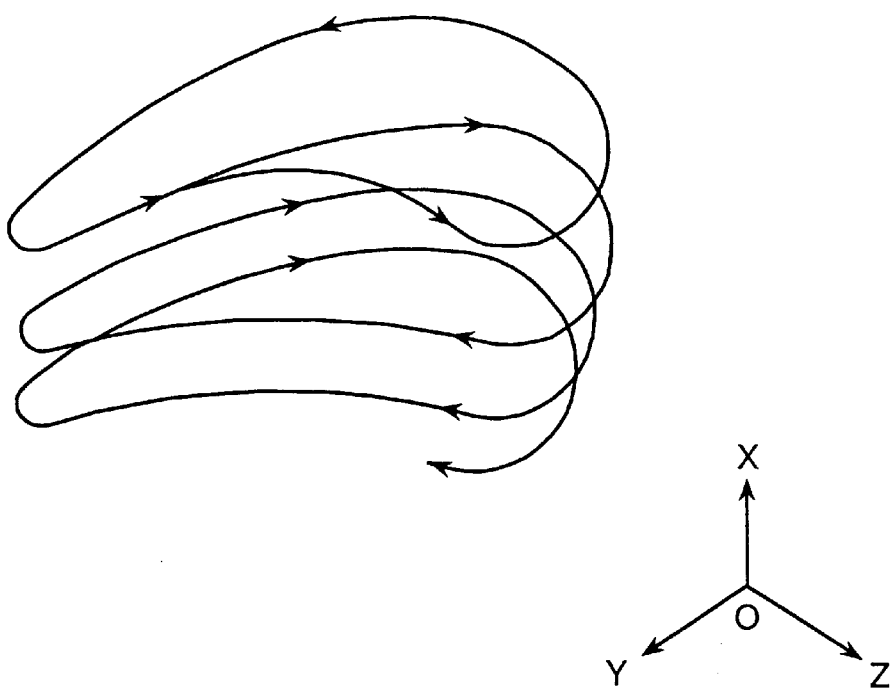
Figure 14:
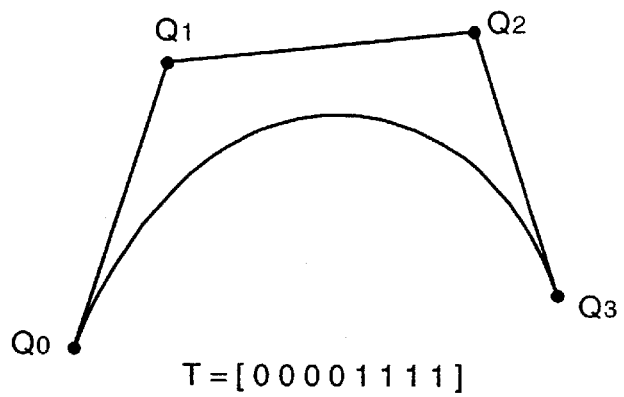
FIGS. 14(a) to 14(c) are diagrams showing a way of transforming other interpolation into NURBS interpolation according to the present invention.
Figure 14:
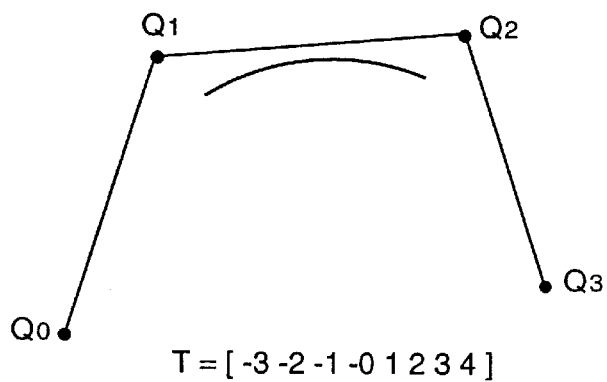
Figure 14:
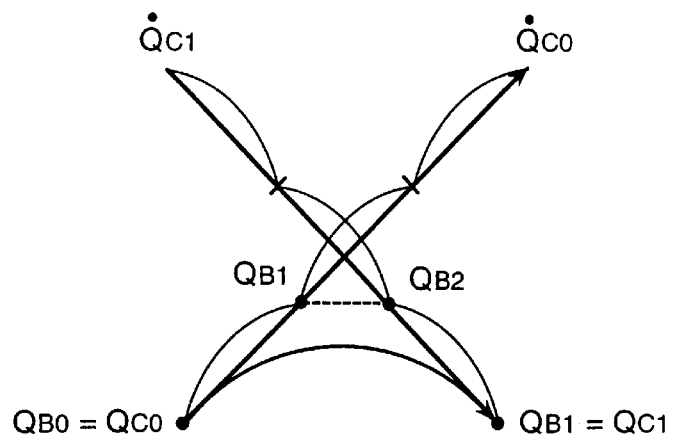

There can be a case where the connection of NURBS curves for machining is formed of a line between a start point 121 and an end point 122, as shown in FIG. 12(a). In this case, since the start point 121 and the NURBS curve are not continuous, a concavity may be caused in machining if the tool path passes through a curve 123.

In accordance with the present invention, in order to prevent this concavity, the tool path is first retracted along the tangential direction of the NURBS curve at the start point 121, passed through an intermediate pass point 125 that does not interfere with the machining surface, and then changed to a NURBS curve 124 that approaches along the tangential direction at the end point 122. In this manner, a NURBS curve capable of continuous machining can be calculated.

Since changing from machining along multiple closed curves, as shown in FIG. 13(a), to machining along a continuous screw-and-spiral curve, as shown in FIG. 13(b), makes it possible to machine along a continuous single NURBS curve, both the working efficiency and machining accuracy are improved.

When a position vector of three linear axes and a rotation angle calculated on a machine coordinate system are defined by either a B-spline interpolation or a Bezier interpolation curve, FIG. 14(a) and Expression 12 show the transformation into NURBS interpolation by Bezier interpolation, and FIG. 14(b) and Expression 13 show the transformation into NURBS interpolation by B-spline interpolation; where, Qi is a control point, T is a knot vector, and Ni,4(t) is a basis function. When the above is defined by a Coons interpolation curve, FIG. 14(c) and Expression 14 can be transformed into Bezier interpolation. It therefore is possible to transform into a NURBS interpolation expression using FIG. 14(a) and Expression; where, Qb is a control point for Bezier interpolation and Qc is a vector for constituting Coons interpolation. When the above is defined by a polynomial, NURBS interpolation becomes available by generating a series of points and transforming them into a NURBS curve or by converting the polynomial directly into a NURBS interpolation expression. When the above is defined by a combination of an arc and a line, NURBS interpolation is available because each NURBS transformation expression for an arc and a line is known.

$T = [t_0 t_1 t_2 t_3 t_4 t_5 t_6 t_7]$ $= [0 0 0 0 1 1 1 1]$ $N_{0,4}(t) = (1-t)^3$ $N_{1,4}(t) = 3(1-t)^2 t$ $N_{2,4}(t) = 3(1-t)t^2$ $N_{3,4}(t) = t^3$ $(0 \leq t \leq 1)$ Expression 12

$T = [t_0 t_1 t_2 t_3 t_4 t_5 t_6 t_7]$ $= [-3\ -2\ -1\ 0\ 1\ 2\ 3\ 4]$ Expression 13

Expression of curve: $P(t)\ N_{0,4}(t)Q_0 + N_{1,4}(t)Q_1 + N_{2,4}(t)Q_2 N_{3,4}(t)Q_3$ $$N_{0,4}(t) = \frac{1}{6}(1-t)^3$$

$$N_{1,4}(t) = \frac{1}{2}t^3 = t^2 + \frac{2}{3}$$

$$N_{2,4}(t) = -\frac{1}{2}t^3 + \frac{1}{2}t^2 + \frac{1}{2}t + \frac{1}{6}$$

$$N_{3,4}(t) = \frac{1}{6}t^3$$

$(0 \leq t \leq 1)$ $Q_{c0} = Q_{B0}$ $Q_{c1} = Q_{B3}$ $Q_{c0} = -3Q_{B0} + 3Q_{B1} = 3(Q_{B1} - Q_{B0})$ $Q_{c1} = -3Q_{B2} + 3Q_{B3} = 3(Q_{B3} - Q_{B2})$ Expression 14

If the tool axis vector of CL data is set to a fixed value, the rotation angle on a machine coordinate system becomes a fixed value. Accordingly, use of a numerically controlled curved surface machining unit of the present invention makes it possible to generate NURBS interpolation NC data for a simultaneous three-axis control NC machine equipped only with three linear axes.

Figure 15:
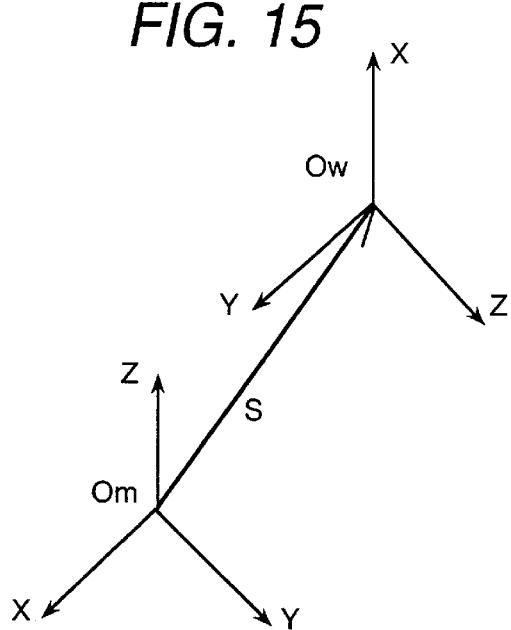
FIG. 15 is a diagram showing the relationship between coordinate systems upon transformation from a machine coordinate system into a workpiece coordinate system (inverse transformation) according to the present invention.

Next, checking and modifying the precision of a NURBS curve on a machine coordinate system will be described hereunder. Transformation from a machine coordinate system into a workpiece coordinate system is an inverse of FIG. 7 and is calculated by the following Expressions 15, 16, 17, 18 and 19, as shown in FIG. 15. Symbols used in these expressions are the same as those in FIG. 7.

$M = (Mx, My, Mz, B, C)$ Expression 15

$$MC = \begin{pmatrix} \cos(-C) & -\sin(-C) & 0 \\ \sin(-C) & \cos(-C) & 0 \\ 0 & 0 & 1 \end{pmatrix}$$ Expression 16

$$Mb = \begin{pmatrix} \cos(-B) & 0 & \sin(-B) \\ 0 & 1 & 0 \\ -\sin(-B) & 0 & \cos(-B) \end{pmatrix}$$

$$\begin{pmatrix} Wax \\ Way \\ Waz \end{pmatrix} = McMb \begin{pmatrix} Mx \\ My \\ Mz \end{pmatrix}$$ Expression 17

$Dak = Pin(B)$ $Daj = \cos(B)\sin(C)$ $Dai = \cos(B)\cos(C)$ Expression 18

$Da = (J, K, I) = (Dai, Daj, Dak)$ $S = (Xs, Ys, Zs)$ $Wa = (Wax, Way, Waz) - S = (Y, Z, X)$ $W = (X, Y, Z)$ $D = (I, J, K)$ Expression 19

A sequence-of-point data is calculated from a NURBS curve of the three linear axes and rotation angle calculated on a machine coordinate system. The calculated sequence-of-point data is converted into CL data on a workpiece coordinate system using the coordinate system in FIG. 15 and Expressions 15, 16, 17, 18 and 19. The converted CL data is then compensated along an inverse direction to that in FIG. 4 so as to calculate CL date before compensation.

Figure 16:
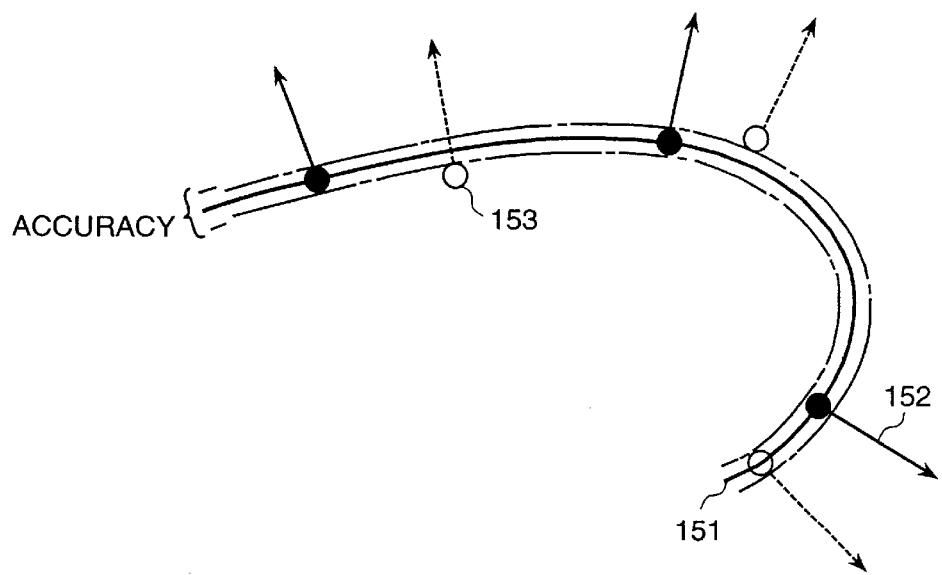
FIG. 16 is a diagram showing a way of evaluating a NURBS curve on a machine coordinate system according to the present invention.

Using the CL data 11 on the coordinate system as inputted in FIG. 1, a NURBS curve 151 expressed by Expressions 1, 2 and 3 and a tool axis vector 152 on each point, as shown in FIG. 16, are calculated by a NURBS curve generating method described in for example, "The NURBS Book". Then, the compensated NURBS data is compared with the NURBS curve 151 and tool axis vector 152 so as to check the accuracy.

A practical way for comparison is to calculate errors on a computer and visually display them on a display or a plotter. That is, a sequence of CL data points converted from a machine coordinate system are superposed on the curve so as to check the accuracy.

Figure 17:
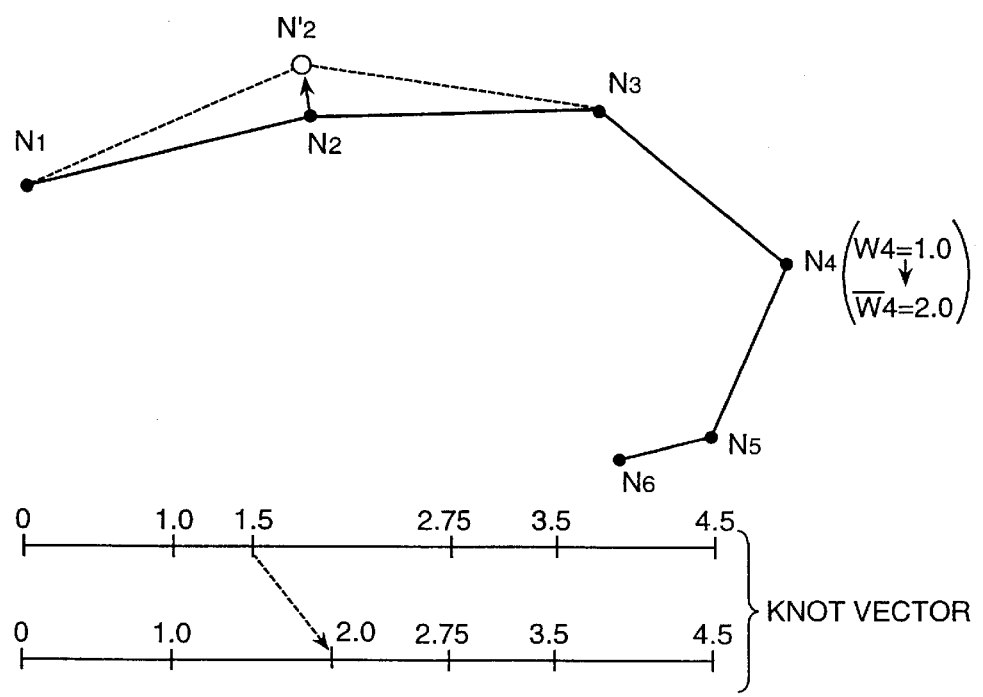
FIG. 17 is a diagram showing a way of modifying a NURBS curve according to the present invention.

FIG. 17 shows how to modify a curve if a point 153, for example, falls outside the required accuracy. In the FIGURE, the control points Wi of the NURBS curve represent weights. There are three ways of modification available: changing the control point N2 to N2', modifying Wi, or modifying the chord length between knot vectors.

Next, reading linear interpolation NC data for a simultaneous 4-axis-or 5-axis control machine and converting the data into NURBS interpolation NC data will be described hereunder. Linear interpolation NC data is read and unnecessary codes are removed from the NC data, and then three linear axes and one or two rotary axes on a machine coordinate system are calculated.

Using the coordinate system of FIG. 15 and Expressions 15, 16, 17, 18 and 19, the data on a machine coordinate is converted into CL data on a workpiece coordinate system, and this data is then stored in the CL data file 11 shown in FIG. 1. Using this data, it becomes possible to calculate NURBS interpolation NC data on a curved surface machining unit of the present invention shown in FIG. 1.

In order to improve the machining accuracy of a shape, there can be a situation where the tool path is required to pass through a certain point, range or line without fail. In this situation, curved surface machining in an improved shape becomes possible by increasing the number of pass points, for example, by specifying additional pass points to those accepted in FIG. 5.

According to a numerically controlled curved surface machining unit of the present invention, it is possible to move a tool smoothly along a NURBS (non-uniform rational B-spline) curve and machine a workpiece. Hence, it becomes possible to improve the machining surface roughness and machining surface-accuracy, eliminate hand finishing, and reduce machining steps drastically. In addition, since NC data volume can be reduced, it becomes possible to prevent the reduction of average feed rate to be caused by a servo mechanism and achieve high-speed machining. Besides, it is also possible in accordance with the present invention to make a fine adjustment in consideration of possible deformation of a shape.

Next, another embodiment of the present invention will be explained hereunder.

Figure 18:
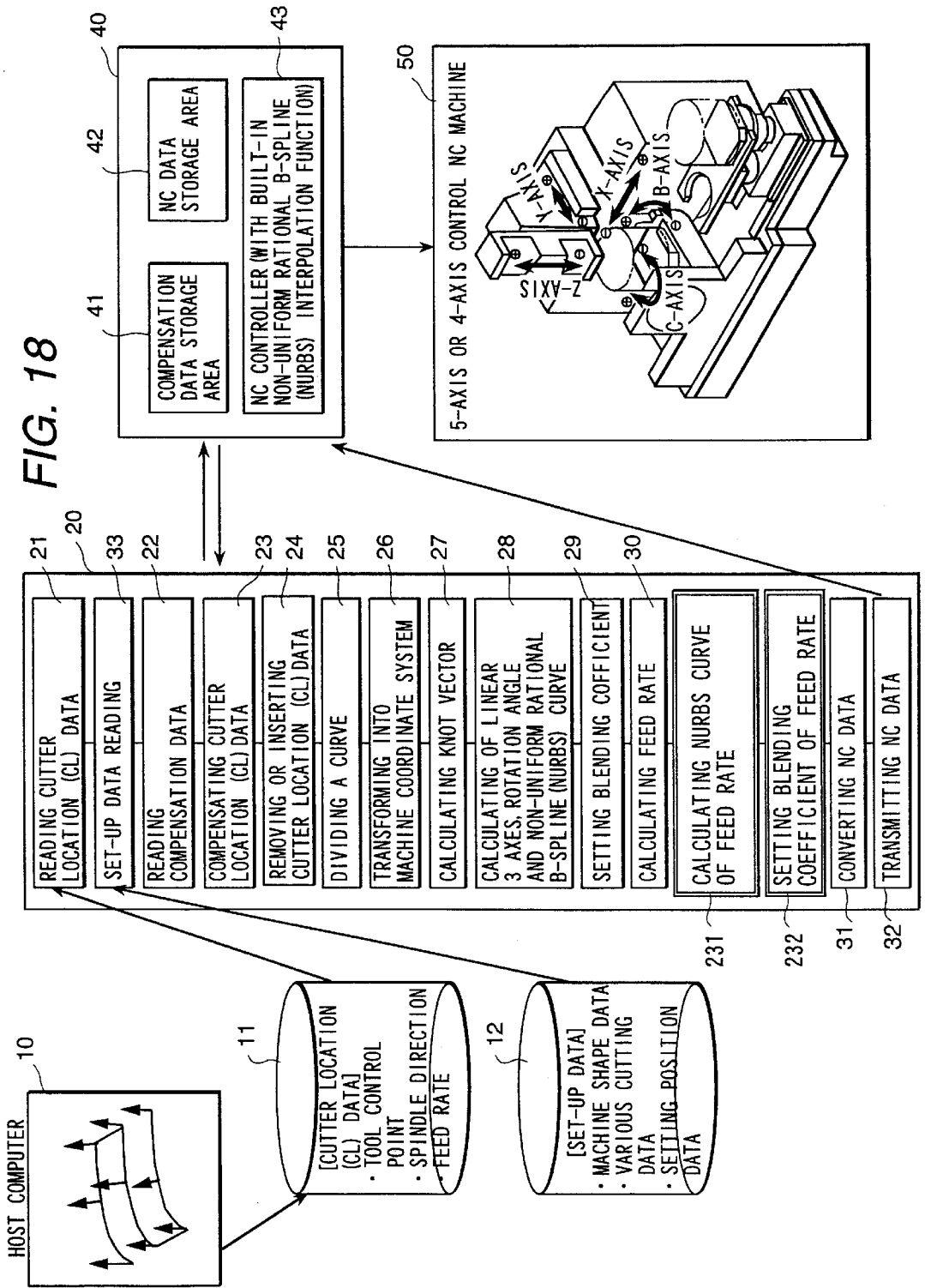
FIG. 18 is a block diagram showing the system configuration of another embodiment of a numerically controlled curved surface machining unit according to the present invention.

FIG. 18 is a block diagram showing the configuration of another embodiment of a numerically controlled curved surface machining unit according to the invention. This embodiment of the invention is a numerically controlled curved surface machining unit similar to that shown in FIG. 1 and to which new functions are added. That is to say, new functions of the invention are added to the numerically controlled curved surface machining unit, such as a means 231 and a means 232.

The curved surface data generated by a host CAM system 10 is divided, within a specified allowance, into a number of lines along a tool path expressed on a workpiece coordinate system. Tool control point vector information and tool axis vector information at individual dividing points, which are generated as above, and feed rate information on a workpiece coordinate system are described in the order of the sequence in the tool path so as to generate cutter location (CL) data The generated CL data 11 is inputted into the computer 20 of the numerically controlled curved surface machining unit 50 so as to convert the data into NC data for operating the NC machine in accordance with the machine configuration of the numerically controlled curved surface machining unit.

With the function in step 21, the numerically controlled curved surface machining unit 50 reads the CL data.

In steps 33 and 22 to 29 with external file 2, in accordance with the mode of the embodiment of the numerically controlled curved surface machining unit shown in FIG. 1, the position vector and NURBS (non-uniform rational B-spline) curve of the three linear axes and a rotation angle, feed rate on a machine coordinate system, and knot vector at the control points on a machine coordinate system are calculated on the basis of the machine configuration of the numerically controlled curved surface machining unit 50.

Figure 19:
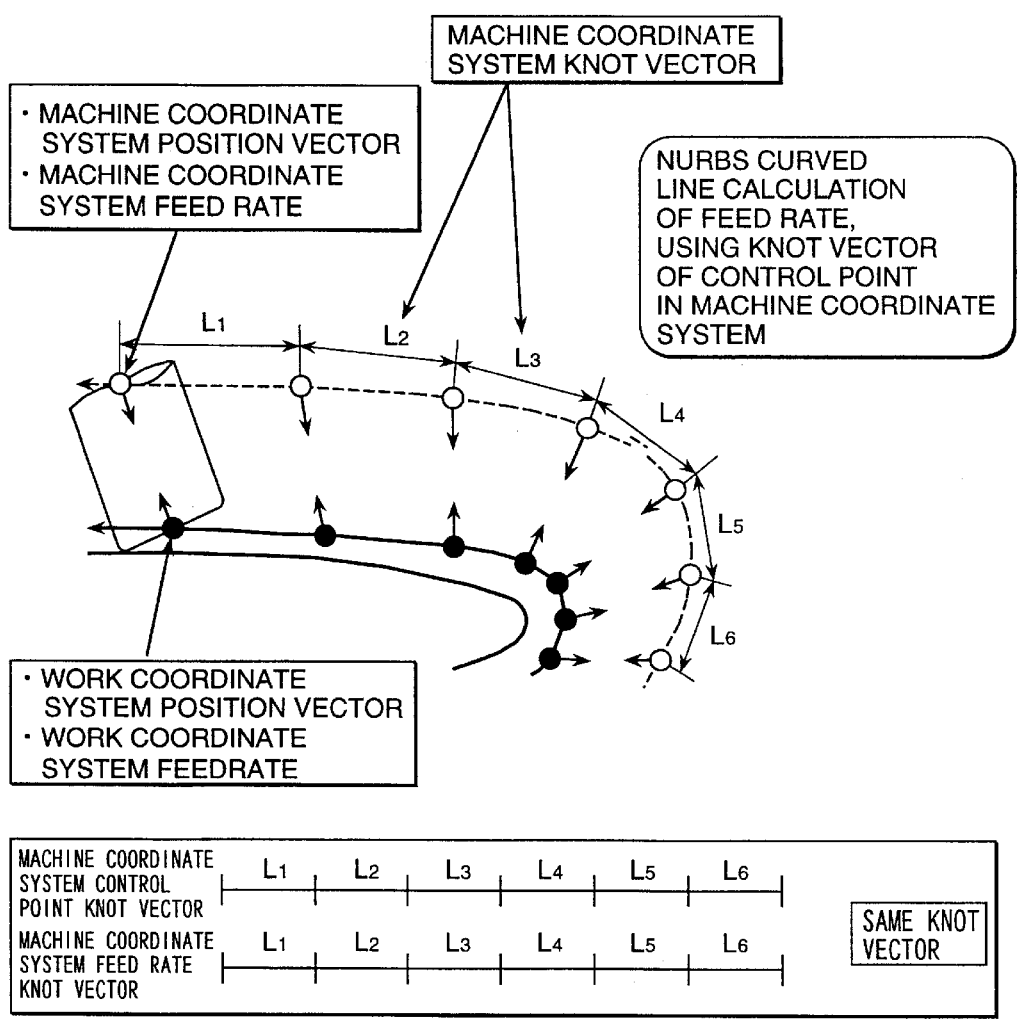
FIG. 19 is a diagram showing how to define a knot vector in the NURBS curve interpolation of feed rate.

In step 231, a NURBS curve on a machine coordinate system is calculated. The feed rate on a machine coordinate system, which is calculated from the above Expression. 10 using the position vector on a workpiece coordinate system, feed rate on a workpiece coordinate system, and position vector on a machine coordinate system, generates a NURBS curve expressed by Expressions 1, 2 and 3, using the knot vector (i of the control points of the three linear axes on a machine coordinate system, as shown in FIG. 19, according to a method for generating a NURBS curve shown, for example, in the afore-mentioned "The NURBS Book".

Figure 20:
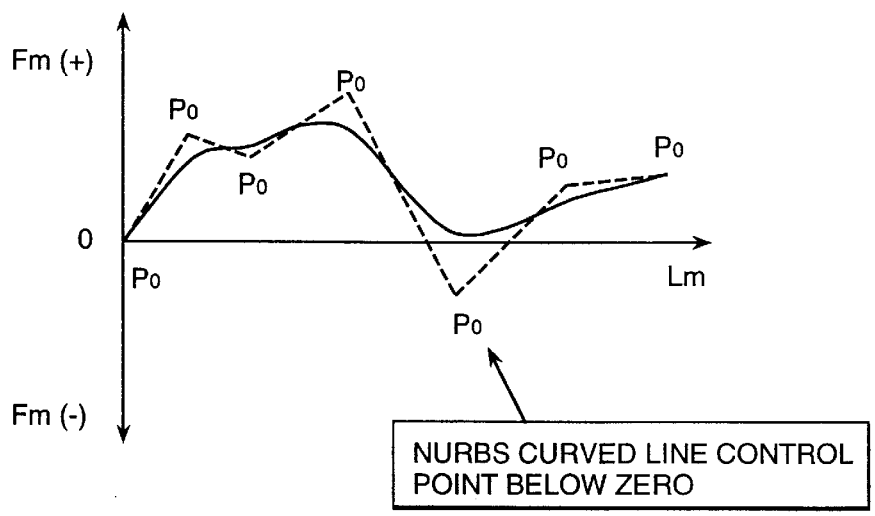
FIG. 20 is a diagram showing the relationship between NURBS curve on a machine coordinate system and control points thereof.

The control point on the NURBS curve of the feed rate on a machine coordinate system generated as above can be less than zero, as shown in FIG. 20, dependent on the shape of the NURBS curve.

Figure 21:
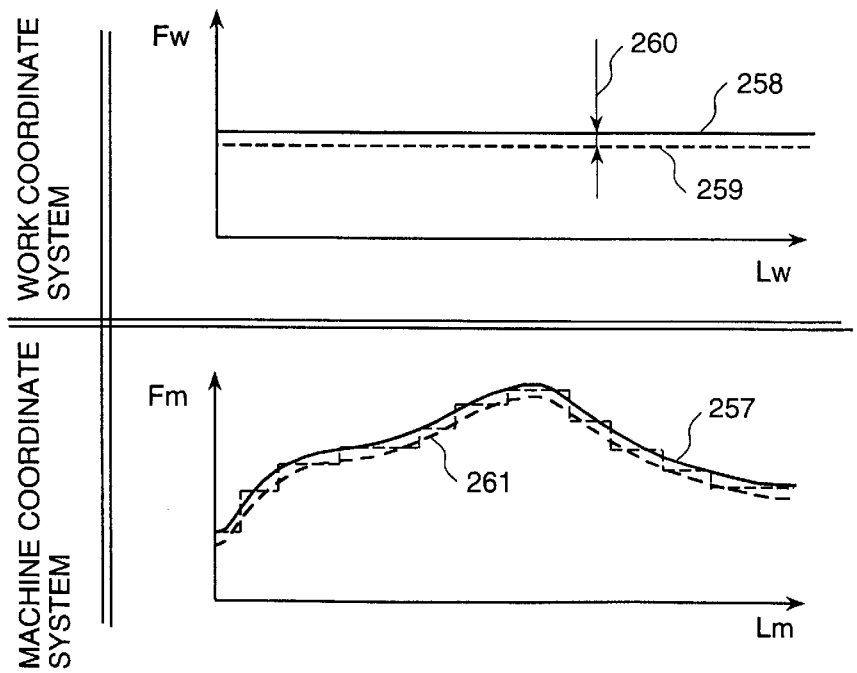
FIG. 21 is a diagram showing the optimization of feed rate on a machine coordinate system using a blending factor.

In step 232, the blending factor of the NURBS curve of the feed rate is calculated. While the NURBS curve 257 of the feed rate on a machine coordinate system calculated in step 31 is expressed as the actual feed rate on a workpiece coordinate system, as shown in FIG. 21, there arises an excess or insufficiency 260 of the feed rate as a whole when compared to the specified feed rate 259 on a workpiece coordinate system. In order to eliminate this and optimize the curve up to the specified feed rate 259, another NURBS curve 261 of the feed the on a machine coordinate system is calculated by multiplying the knot vector calculated in step 27 by the blending factor.

In step 31, by substituting the control points on the NURBS curve of the three linear axes on the machine coordinate system calculated in steps 28 to 30 for X, Y and Z of the NURBS interpolation instruction, control points on the NURB curve of the two rotary axes for B and C, knot vector for K, weights for R, and the control point on the NURBS curve of the feed rate on a machine coordinate system calculated in step 232 for F, data is converted into NC data according to the format of the NURBS interpolation instruction.

In step 32, the last converted NC data is transmitted as NC data from the computer 20 and is read and stored into the NC data storage area 42 of the NC controller 40.

The NC control mechanism 43, equipped with a built-in NURBS interpolation function of the NC controller 40, reads NC data from the NC data storage area 42 and, while analyzing the data, controls a 5-axis or 4-axis control NC machine and achieves NC machining.

In the embodiment, when an output format of NC data is given in the form of a general free curve, it is possible to convert data into NC data and achieve NC machining by interpolating the tool control point vector and machining speed in the same manner as above, that is, calculating the control points X, Y and Z on the free curve of the three linear axes on a machine coordinate system, control points B and C on the free curve of the two rotary axes, knot vector K, weight R, control point F on the free curve of the feed rate on a machine coordinate system.

According to a mode of the embodiment, the cutting tool life can be extended because there is provided a means for determining an optimum actual feed rate and cutting specification on a tool locus moving along a free-curve. Besides, since the reduction of average feed rate due to servo mechanism control can be eliminated, it becomes possible to lessen the burden on the numerically controlled curved surface machining unit and achieve curved surface machining with low machined surface roughness and high machined surface accuracy. As a result of the above improvement, hand finishing required as an after-process can be eliminated and the number of machining steps can be reduced drastically. It also becomes possible to make a fine adjustment in consideration of possible variation of the feed rate.

What is claimed is:

1. A numerically controlled curved surface machining unit equipped with three linear axes and, at least one rotary axis, including a simultaneous multiple-axis control NC machine, which is numerically controlled by a numerical control unit with a numerical control NURBS (non-uniform rational B-spline) interpolation function, comprising:

means for reading tool control point vector data and tool axis vector data, calculated along a tool path on a workpiece coordinate system with defined curved shape by a host computer, as cutter location (CL) data and converting the CL data into a position vector of the three linear axes and a rotation angle on a machine coordinate system so as to operate the simultaneous multiple-axis control NC machine in accordance with the machine configuration of the NC machine;

means for calculating knot vectors of a NURBS curve with the most suitable chord length on the basis of a position vector of the three linear axes and a rotation angle calculated on a machine coordinate system;

means for calculating each NURBS curve of the three linear axes and one rotary axis using the knot vectors;

means for converting the NURBS curve into NURBS interpolation NC data;

means for converting the feed rate on the workpiece coordinate system into the feed rate per minute or feed rate per inverse time on the machine coordinate system;

means for transmitting the obtained CL data to the NC control unit;

means for removing or inserting CL data along the tool path in accordance with the machining accuracy of the curved surface, upon reading data as CL data; and means for reading a compensation value based on an individual difference of each tool from the NC control unit, upon reading data as CL data, and compensating the read CL data in accordance with the tool compensation value.

2. A numerically controlled curved surface machining unit equipped with three linear axes and, at least, one rotary axis, including a simultaneous multiple-axis control NC machine, which is numerically controlled by a numerical control unit with a numerical control NURBS (non-uniform rational B-spline) interpolation function, comprising:

means for reading a NURBS curve of three linear axes and a rotary axis calculated on a machine coordinate system;

means for reading cutter location (CL) data calculated on a workpiece coordinate system;

means for calculating a NURBS curve from a tool control point vector of the CL data;

means for calculating a NURBS curve from a tool axis vector of the CL data;

means for calculating each sequence-of-point data to a specified machining accuracy from the NURBS curve of three linear axes and a rotary axis on the machine coordinate system;

means for converting the sequence-of-point data on the machine coordinate system into CL data on the workpiece coordinate system; and means for calculating each error between the CL data converted into the workpiece coordinate system and the NURBS curve of the tool control point vector and the NURBS curve of the tool axis vector calculated on the workpiece coordinate system;

means for modifying the control point or knot vector or weights of the NURBS curve on the machine coordinate system based on the calculation result of the error; and means for reading a tool compensation value from the NC machine and converting the CL data calculated on workpiece coordinate system in accordance with the compensation value.

* * * * *